United States Patent [19]

Haefner et al.

[11] Patent Number: 4,685,219

[45] Date of Patent: * Aug. 11, 1987

[54] SPIRIT LEVEL

[75] Inventors: LeRoy H. Haefner, Edmond; Stephen M. Rhodes, Mustang, both of Okla.

[73] Assignee: Macklanburg-Duncan Company, Oklahoma City, Okla.

[*] Notice: The portion of the term of this patent subsequent to Aug. 13, 2002 has been disclaimed.

[21] Appl. No.: 765,701

[22] Filed: Aug. 12, 1985

Related U.S. Application Data

[63] Continuation-in-part of Ser. No. 485,239, Apr. 15, 1983, Pat. No. 4,534,117.

[51] Int. Cl.⁴ .................................................. G01C 9/28
[52] U.S. Cl. ......................................... 33/379; 33/381
[58] Field of Search .................... 33/348.2, 377, 379, 33/381, 382, 389

[56] References Cited

U.S. PATENT DOCUMENTS

| | | | |
|---|---|---|---|
| D. 280,302 | 8/1981 | Clark | D10/74 |
| 1,134,162 | 4/1915 | Schmid | 33/211 |
| 1,166,045 | 12/1915 | Gethmann | 33/379 |
| 1,426,454 | 8/1922 | Bredeson | 33/381 |
| 1,777,429 | 10/1930 | Charlton | 33/381 |
| 1,879,263 | 9/1932 | Huffschmidt | 116/117 |
| 2,175,909 | 10/1939 | Nelson | 189/78 |
| 2,280,389 | 4/1942 | Edwards | 189/75 |
| 2,307,568 | 1/1943 | Colbert | 88/98 |
| 2,344,241 | 3/1944 | Flint | 240/6.44 |
| 2,536,788 | 1/1951 | Vaida | 33/381 |
| 2,669,029 | 2/1954 | Ries | 33/377 |
| 2,810,206 | 10/1957 | Ziemann | 33/381 |
| 2,948,066 | 8/1960 | Rosenholm | 33/382 |
| 3,000,345 | 9/1961 | Gray, Jr. et al. | 116/117 |
| 3,004,305 | 10/1961 | Goodemote et al. | 20/56.4 |
| 3,029,524 | 4/1962 | Vaida et al. | 33/381 |
| 3,167,870 | 2/1965 | Streeter | 33/381 |
| 3,190,010 | 6/1965 | Johnson | 33/381 |
| 3,311,990 | 4/1967 | Wright | 33/211 |
| 3,442,024 | 5/1969 | Don | 33/381 |
| 3,491,454 | 1/1970 | Wright | 33/211 |
| 3,518,339 | 6/1970 | Goff | 264/249 |
| 3,593,428 | 7/1971 | Jacoff | 33/211 |
| 3,738,015 | 6/1973 | DeJong | 33/379 |
| 3,835,549 | 9/1974 | DeJong et al. | 33/379 |
| 4,073,062 | 2/1978 | Wright | 33/388 |
| 4,109,392 | 8/1978 | Streeter | 33/381 |
| 4,124,940 | 11/1978 | Vaida | 33/379 |
| 4,259,135 | 3/1981 | Kulla | 156/293 |
| 4,283,885 | 8/1981 | Remick et al. | 49/466 |
| 4,419,833 | 12/1983 | Wright | 33/379 |
| 4,492,038 | 1/1985 | Mayes | 33/379 |
| 4,534,117 | 8/1985 | Haefner et al. | 33/379 |

FOREIGN PATENT DOCUMENTS 2128056  12/1972  Fed. Rep. of Germany ........ 33/381

Primary Examiner—Richard R. Stearns
Attorney, Agent, or Firm—William R. Laney

[57] ABSTRACT

A spirit level which includes an elongated frame with one or more vial receiving openings therein. A liquid-containing spirit level vial extends at least partially across each of the openings. A transparent sight plate is removably extended at least partially across each of the openings. Structure is provided for limiting the movement of the respective sight plate in the respective opening toward the spirit level vial located therein, and a gasket is positioned in the opening over the sight plate to retain the sight plate against movement away from the spirit level vial. The gasket is removably retained in its described position, and can be removed to permit the sight glass to be extricated to permit access to be easily had to the respective spirit level vial.

20 Claims, 10 Drawing Figures

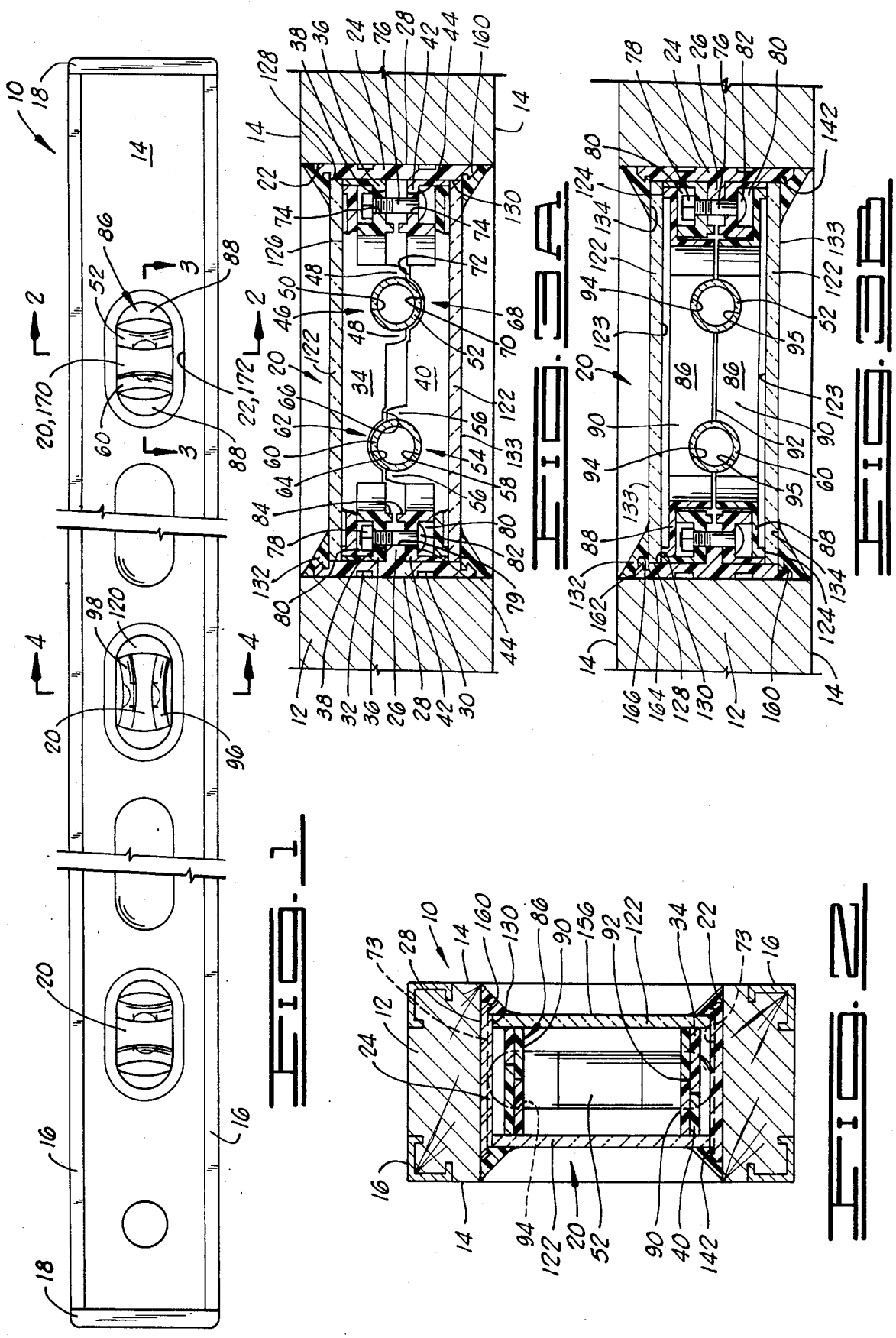

SPIRIT LEVEL

BACKGROUND OF THE INVENTION

This application is a continuation-in-part of U.S. patent application Ser. No. 485,239, filed Apr. 15, 1983, now U.S. Pat. No. 4,534,117.

1. Field of The Invention

This invention relates to spirit levels, and more particularly, to a spirit level having a gasket for retaining a sight glass therein and an annular vial holder for locating tubular spirit level vials therein.

2. Brief Description of The Prior Art

Most of the spirit levels of the prior art are manufactured such that they are not easily repaired. A typical spirit level is shown in U.S. Pat. No. 1,426,454 to Bredeson which discloses a level vial cemented in place in an opening in a body. This level is specifically designed so that the vials are permanently held in place, and is thus not repairable. In the present invention, the spirit level vials are held by vial holding means positioned within a hole in a frame. This vial holder may be removed from the frame so that vials may be replaced as necessary. Further, the present invention utilizes a sealing gasket which holds a sight plate in place over the vials and which can be easily removed. The sight plates in Bredeson are held in place by fasteners and putty, and thus are difficult to remove. Once removed, additional putty must be used in reinstallation.

U.S. Pat. No. 3,029,524 to Vaida et al. shows a vial unit which is plastered in place in a hole in a multi-piece frame. A countersunk cavity in the frame receives a portion of the plaster. Thus, the vial unit may not be easily removed and replaced without removal of the plaster from the cavity. Also in Vaida et al., a sight plate is plastered in place in a manner similar to Bredeson. The vial holding means of the present invention is more easily removed, and the gasket provides easy removal of the sight plate.

The level shown in U.S. Pat. No. 2,536,788 discloses a removable vial housing. However, the sight plate of the Vaida patent is held in place by a retainer ring unlike the resilient sealing gasket of the present invention.

SUMMARY OF THE INVENTION

Two embodiments of the spirit level of the present invention are disclosed, both embodiments comprising a frame defining at least one hole therethrough, a liquid-containing level vial extending at least partially across the hole, a transparent sight plate extending at least partially across the hole, means for limiting movement of the sight plate in the hole toward the level vial, a gasket positioned in the hole for retaining the sight plate against movement away from the level vial and gasket retaining means for engaging and maintaining the gasket in position.

In the first embodiment, the frame hole is substantially uninterrupted and has a sleeve positioned therein which is coaxial thereto. Vial holding means are positionable in the sleeve for holding the vial in an operating position in the hole. Preferably, the vial holding means comprises a first portion having a pair of vial engaging lugs and defining a curvilinear surface therebetween with an arc greater than 180° into which an end of the vial is inserted and a second portion having a curvilinear surface with an arc less than 180° adjacent the curvilinear surface of the first portion. The curvilinear surface of the second portion is spaced from the vial so that its operating position may be calibrated by adjustment of the first portion.

The gasket of the first embodiment comprises a first side having a substantially monoplanar portion adapted to contact the sight plate, a radially outer second side substantially normal to the plane of the first side, a radially outer portion adjacent the second side which defines a radially outwardly opening groove for engagement with an inwardly extending tongue on the sleeve adjacent the sight plate, and a radially inner third side facing the central opening through the hole in the frame and intersecting the plane of the first side at an acute angle. The gasket further comprises an annular sealing lip at a radially inner edge of the first side at its nearest approach to the first side and which extends toward the plate to be sealingly deflected into the plane of the first side when the first side is placed in contact with the plate. Preferably, a second annular sealing lip at an edge of the second side at its nearest approach to the third side is adapted to be sealingly deflected into alignment with the second side when placed in contact with the surface of the frame forming the opening therein.

In the other embodiment of the level, shoulder means are provided in the hole in the frame and an annular vial holder is positioned adjacent thereto. The vial holder has a central opening therethrough and has recesses opening from radially outer sides thereof. A pair of vial receiving ports in the vial holder locate the vial in its position across the hole in the frame. Cement is utilized to hold the vial holder in position.

The gasket of the second embodiment comprises a first substantially monoplanar side adapted to contact the sight plate, a second side extending normally from the plane of the first side, and a third inner side facing a central opening through the hole and intersecting the plane of the first side at an acute angle. Rather than the groove utilized in the first embodiment, the second embodiment of the gasket further has an annular flange therearound which projects radially outwardly from the second side for engaging the gasket in an annular groove around the opening in the frame. As with the first embodiment, the second embodiment preferably includes an annular sealing lip on the first side for sealing against the plate and an outwardly extending lip on the second side for sealing against the surface of the frame forming the hole therein.

An important object of the present invention is to provide a spirit level with an improved structure for retaining protective sight glasses in a position on the opposite sides of liquid-containing spirit level vials.

A further object of the invention is to provide an easily removed elastomeric gasket for sealingly retaining sight glasses in position.

Another object of the invention is to provide an embodiment of a vial holding means which is easily removed from the frame of a spirit level for facilitating repair thereof.

Still another object of the invention is to provide a vial holder for use in a spirit level which can be more easily adjusted within a frame of the spirit level.

A futher object of the invention is to provide an improved vial holder for a spirit level which is easily repaired and which utilizes few parts.

Additional objects and advantages of the invention will become apparent as the following detailed description of the preferred embodiments are read in conjunction with the accompanying drawings which illustrate such embodiments.

BRIEF DESCRIPTION OF THE DRAWINGS

FIG. 1 is an elevation view of the spirit level of the present invention shown so that the various liquid-containing level vials are visible.

FIG. 2 is a transverse cross-sectional view taken along lines 2—2 in FIG. 1.

FIG. 3A is a longitudinal cross-sectional view taken along lines 3—3 in FIG. 1 with a vial holder cover cut away.

FIG. 3B is a longitudinal cross-sectional view taken along lines 3—3 in FIG. 1 with a vial holder cover installed.

DESCRIPTION OF THE PREFERRED EMBODIMENT

Figure 4:
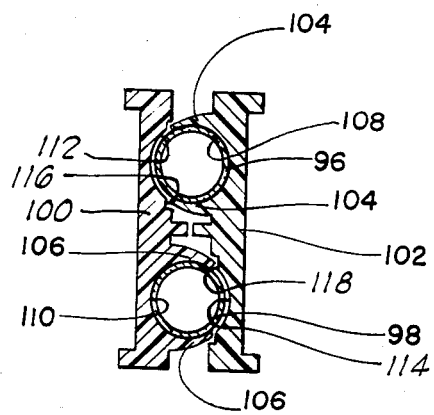
FIG. 4 is a partial transverse cross section taken along lines 4—4 in FIG. 1.

Referring now to the drawings, and particularly FIG. 1, the spirit level of the present invention is shown and generally designated by the numeral 10. The level includes an elongated rigid body or frame 12, preferably of right parallelepiped configuration and having a pair of opposed parallel planar sides 14. Frame 12 is preferably made of wood and has attached thereto protective metallic edges 16 and protective metallic end caps 18.

Referring now also to FIGS. 2, 3A and 3B, an embodiment of frame 12 defines a plurality of holes or openings 20 therethrough. In the preferred embodiment, openings 20 are bounded by a surface or wall 22 which extends substantially normally to sides 14. Each opening 20 extends straight through frame 12 and has no shoulders, obstructions or other irregularities therein. Each surface 22 is essentially uninterrupted.

Positioned in each opening 20 adjacent surface 22 is an annular sleeve 24 having a central opening substantially coaxial with opening 20. Sleeve 24 has an inwardly directed shoulder 26 extending therefrom at longitudinally opposite ends 28 thereof.

Outer channels 20 on an outer portion of ends 28 of sleeve 24 define a plurality of cavities 32 adjacent surface 22. Each sleeve 24 is preferably cemented into its operating position in the respective opening 20, and cavities 32 act to receive a quantity of cement for good adhesion between the sleeve and surface 22.

First looking at transversely disposed level vials, commonly referred to as plumb vials, in frame 12, FIGS. 2 and 3A show a first vial holder 34 positioned in sleeve 24 and which has a pair of opposite end portions 36 which engage a surface 38 of corresponding shoulders 26. Another vial holder 40 has opposite end portions 42 which engage another surface 44 of corresponding shoulders 26.

Vial holder 34 has a first portion 46 with a pair of vial engaging lugs 48 and which defines a curvilinear surface 50 having an arc of greater than 180° between the lugs for engaging an end of a vial 52. Similarly, vial holder 40 has a first portion 54 having lugs 56 and which defines a curvilinear surface 58, also having an arc of greater than 180° for engaging an end of another vial 60.

Vial holder 34 has a second portion 62 which defines a curvilinear surface 64 which is adjacent curvilinear surface 58. Curvilinear surface 64 is spaced from vial 60 to allow a slight clearance so that an operating position of vial 60 may be calibrated with respect to frame 12 by adjustment of vial holder 40. Second portion 62 of vial holder 34 also has a recess 66 adjacent curvilinear surface 64 for receiving the ends of lugs 56 on vial holder 40. Vial holder 40 has a similar second portion 68 defining a curvilinear surface 70 adjacent curvilinear surface 50 and spaced from vial 52 such that vial holder 34 may be adjusted to calibrate an operating position of vial 52. Second portion 68 of vial holder 40 also has a recess 72 adjacent curvilinear surface 70 for receiving the ends of lugs 48.

Vial holders 34 and 40 thus act as means for independently locating and calibrating vials 52 and 60 respectively in the desired operating position within the corresponding opening 20 in frame 12.

A study by those skilled in the art will show that, in the preferred embodiment, vial holders 34 and 40 are identical. One vial holder is simply positioned on one side of shoulders 26 and the other vial holder is placed in a reverse position on the opposite side of the shoulders. In this way, only one vial holding part need be manufactured.

Sleeve 24 has a plurality of slots 73 therein which are substantially normal to sides 14 of frame 12. Slots 73 provide clearance for the ends of vials 52 and 60, as best shown in FIG. 2.

Fastener means are used to hold vial holders 34 and 40 in position against shoulders 26 of sleeve 24 and provide adjustment thereof. In the preferred embodiment, end portions 36 of vial holder 34 and end portions 42 of vial holder 40 each define a hole 74 therein through which is passed a screw 76 which engages a nut 78. An inwardly facing notch 79 on each shoulder 26 allows for clearance of screw 76. End portions 36 and 42 also each define a cavity 80 for receiving either head 82 of screw 76 or nut 78. By adjusting the position of a vial holder and by adjusting the tightness of the fastener means, the operating position of the corresponding vial can be properly calibrated with respect to frame 12.

Substantially cylindrical pins 84 extend from each vial holder toward a corresponding pin on the opposite vial holder at each end thereof. Ideally, pins 84 should be spaced apart when the fastener means is tightened. If pins 84 touch, the fasteners are too tight.

Cement may be used if desired to lock all of the parts in place after calibration.

A cover 86, shown in FIGS. 2 and 3B, is positioned on the outer side of both vial holders 34 and 40. Each cover 86 has a first portion 88 which extends substantially parallel to sides 14 of frame 12 and which at least partially covers head 82 of screw 76 and nut 78 for aesthetic purposes. Each cover 86 also has a second portion 90 which extends substantially normal to sides 14 of frame 12. Normal portions 90 define a small gap 92 therebetween and vial recesses 94 and 95 therein which are actually slightly spaced from the vials. Normal portions 90 substantially enclose a central portion of opening 20 and cover first portion 46 and second portion 62 of vial holder 34 and also first portion 54 and second portion 68 of vial holder 40. In this way, at least a portion of vial holders 34 and 40 are aesthetically covered and when vials 52 and 60 are viewed through opening 20, a substantially continuous surface is visible in opening 20.

FIG. 4 illustrates similar construction for the location and retaining of longitudinally disposed level vials 96 and 98, commonly called leveling vials. A pair of vial holders 100 and 102 have substantially identical lugs 104 and 106 and define curvilinear surfaces 108 and 110 having arcs of greater than 180° for receiving ends of vials 96 and 98, respectively. Vial holder 100 defines a curvilinear surface 112 adjacent curvilinear surface 108 in vial holder 102. A corresponding curvilinear surface 114 in vial holder 102 is adjacent curvilinear surface 110 in vial holder 100. Curvilinear surfaces 112 and 114 are spaced from vials 96 and 98 respectively so the vials may be calibrated in a manner similar to that for plumb vials 52 and 60. A recess 116 adjacent curvilinear surface 112 receives the ends of lugs 104 and a similar recess 118 adjacent curvilinear surface 114 receives the ends of lugs 106.

Fastener means again are utilized to attach vial holders 100 and 102 to the shoulders of the corresponding sleeve and to provide adjustment. Another cover 120 is utilized to enclose the fastening means and aesthetically cover exposed portions of vial holders 100 and 102, as shown in FIG. 1.

Referring again to FIGS. 2, 3A and 3B, positioned on the outward side of each vial holder is a transparent sight plate 122 which extends across and covers opening 20. Sight plate 122 has a side 123 which rests against outer surface 124 of first portion 88 of cover 86 and also against outer edges 126 of each vial holder which act as a support means for the plate around and adjacent peripheral edge 128 thereof. Edge 128 is adjacent radially inner surface 130 of sleeve 24. Surface 124 on cover 86 and edges 126 of the vial holders also act as means preventing movement of the plate toward the vials.

Figure 5:
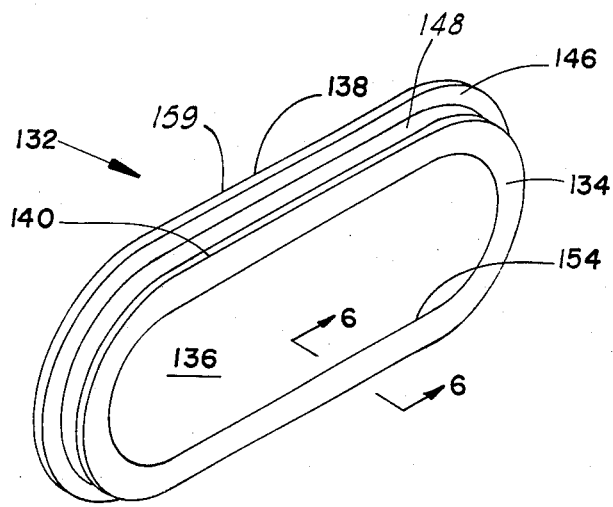
FIG. 5 is an isometric view of a gasket for retaining the transparent sight plates in the spirit level.
Figure 6:
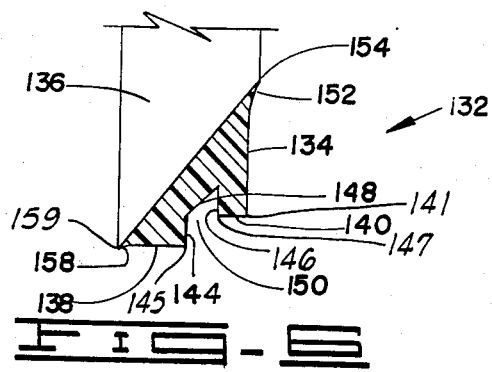
FIG. 6 is a cross-sectional view of the gasket taken along lines 6—6 in FIG. 5.

An endless resilient gasket 132 is positioned adjacent side 133 of transparent plate 122 opposite side 123. Gasket 132 has a substantially monoplanar surface 134 parallel to and in flat contact with side 133 of sight plate 122. Referring now also to FIGS. 5 and 6, gasket 132 is shown in detail and is of annular configuration which defines a central opening 136 therethrough. A peripheral radially outer surface 138 is dimensioned to bear against surface 22 of opening 20 in frame 12 and is substantially perpendicular to the plane of monoplanar surface 134. Another radially outer surface 140 extends normally from edge 141 of monoplanar surface 134 and is radially inwardly spaced from peripheral surface 138 for contact with radially inner surface 142 of sleeve 24.

A first surface 144 extends radially inwardly from edge 145 of surface 138 nearest monoplanar surface 134. A second surface 146 substantially parallel to first surface 144 and spaced therefrom, extends radially inwardly from edge 147 of outer surface 140. A third, angularly disposed surface 148 interconnects parallel sides 144 and 146 such that a radially outwardly disposed cavity 150 is defined of substantially trapezoidal cross section.

An inner lip 152, extending around a radially inner continuous edge 154 of gasket 132, angles out of the plane of monoplanar surface 134 in the relaxed state as best shown in FIG. 6. As illustrated in FIGS. 2, 3A and 3B, lip 152 is sealingly deflected into the plane of surface 133 of sight plate 122 when pressed into flat contact therewith. A continuous seal is thus formed around sight plate 122.

Similarly, an outer lip 158 angles out of radially outer peripheral surface 138 in the relaxed state along an edge 159 of surface 138 spaced from monoplanar surface 134, as best shown in FIG. 6. Lip 158 is sealingly deflected into alignment with surface 22 of opening 20 to continuously seal therearound when in the position illustrated in FIGS. 2 and 3.

Sleeve 24 has a radially inwardly directed tongue 160 of substantially trapezoidal cross section having parallel surfaces 162 and 164. Another surface 166, angled with respect to monoplanar surface 134 of gasket 132, interconnects parallel surfaces 162 and 164. Tongue 160 is dimensioned to conform to cavity 150 in gasket 136 and to be engageable therewith. This mutual engagement between tongue 160 and groove 150 provides means for retaining each gasket 132 and maintaining sealing contact with side 133 of the corresponding sight plate 122 and with inner surface 22 of opening 20 as hereinbefore described.

Gasket 132 is preferably molded from an elastomeric material such as a thermoplastic elastomer.

As will be seen by those skilled in the art, resilient gaskets 132 and sight plates 122 are easily removed to provide access to the vials and the vial holding means. By removing covers 86 and 120, and by releasing the fastener means retaining the vial holders, the vials may be easily replaced. This has been shown to be true even where cement has been used. The spirit level is easily reassembled by reversing these steps.

Figure 7:
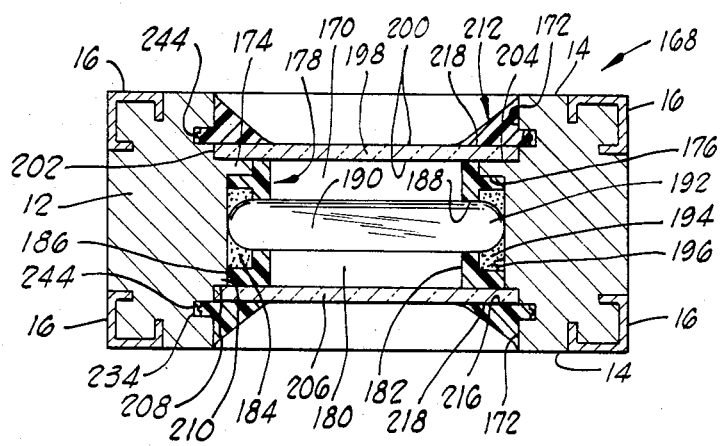
FIG. 7 is a transverse cross-section of an alternate embodiment of the spirit level taken along lines 2—2 in FIG. 1.

Another spirit level embodiment 168 is shown in FIG. 7. In this embodiment, frame 12 again has holes 170 therethrough, but the boundary of each hole is not uninterrupted as with the first embodiment. Instead, each hole 170 is partially bounded by surface 172 of frame 12 extending normal to planar sides 14. Shoulder means 174 extends radially inwardly from bounding surface 172 of each opening 170. Bearing against surface 176 of shoulder means 174 is an annular vial holder 178. Vial holder 178 has a central aperture or opening 180 therethrough, coaxial to hole 170, defined by a radially inner surface 182, and recesses 184 opening on opposite sides of the vial holder from a radially outer surface 186. Vial holder 178 also includes vial receiving ports 188 communicating recesses 184 with central opening 180. A pair of vials 190 pass through vial receiving ports 188 such that the vials extend across the central opening 180, and end portions 192 of the vials terminate in opposite recesses 184. Means, preferably cement 194, or the like, filling recesses 184, is used to fix vials 190 in vial holder 178, and concurrently to attach the vial holder to surface 176 of shoulder 174 and surface 196 of hole opening 170 in frame 12. However, no cement cavities are used in frame 12 as is true in many levels of the prior art, so vial holder 178 may be removed by pressing it out of opening 170.

A first flat transparent sight plate 198, similar to sight plate 122, has a pair of parallel opposite sides 200 and a peripheral edge 202 and is located in opening 170 such that it bears on surface 204 of shoulder 174, substantially covering one end of central opening 180. A similar second flat transparent sight plate 206, bearing on surface 208 of a shoulder means or ledge 210 in hole 170 similarly substantially covers the opposite end of central opening 180. Thus, surface 204 of shoulder means 174 and surface 208 of ledge 210 provide means for limiting movement of sight plates 198 and 206 toward vials 190 and vial holder 178.

Figure 8:
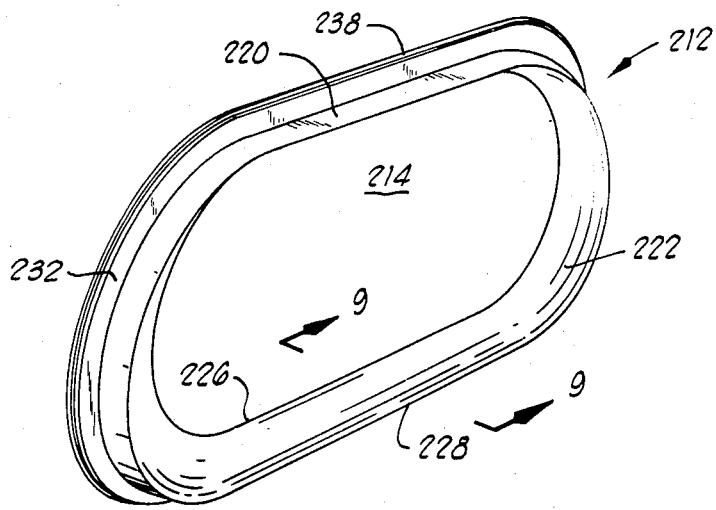
FIG. 8 is an isometric view of an alternate gasket embodiment.
Figure 9:
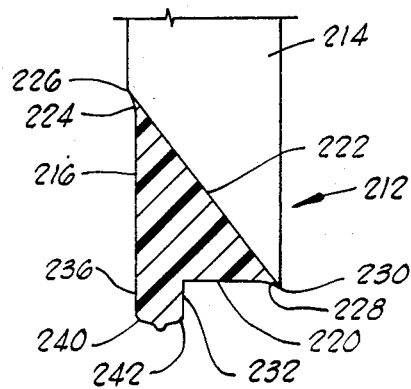
FIG. 9 is a cross-sectional view taken along lines 9—9 in FIG. 8.

Referring now to FIGS. 7–9, movement of each of the plates 198 and 206 away from vial 190 and vial holder 178 is prevented by an endless resilient gasket 212 having a central opening 214 therethrough. Each gasket 212 is of generally triangular cross section and includes a first substantially monoplanar surface 216 which is parallel to and flatly contacts outer surface 218 of respective plate 198 or 206, and a second or radially outer peripheral surface 220 extending substantially parallel to, and in contact with surface or boundary 172 of hole 170, and extending at a substantially right angle to first monoplanar surface 216. A third radially inner hypotenuse side 222 of gasket 212 faces gasket central opening 214.

An inner lip 224, extending around radially inner edge 226 of gasket 212, angles out of the plane of monoplanar surface 216 in the relaxed state as best shown in FIG. 9. As shown in FIG. 7, this lip 224 is sealingly deflected into the plane of surface 216 when surface 216 is pressed into flat contact with the surface of outer side 218 of respective plate 198 or 206.

Similarly, an outer lip 228, extending around radially outer peripheral edge 230, angles out of peripheral surface 220 in the relaxes state as best shown in FIG. 9. Outer lip 228 projects from the base of gasket 212 toward one of parallel planar sides 14 of frame 12 when the gasket is mounted in the frame. As shown in FIG. 7, lip 228 is sealingly deflected into alignment with surface 220 when the latter surface bears against surface 172 which defines hole 170.

Means for engaging each gasket 212 within frame 12 is employed to prevent movement of the gaskets away from sight plates 198 and 206. The preferred embodiment of such means is illustrated in FIGS. 7–9 in which gasket 212 is shown as further including a radially outward flange 232, projecting radially outwardly from side 220 and extending into a radial groove 234 formed in frame 12 around hole 170. Groove 234 opens at surface 176 which bounds hole 170. Surface 236 of flange 232 is preferably an extension of monoplanar surface 216. Gasket 212 is installed by flexibly contracting the gasket along longitudinal edge 238 so that the flange 232 can be located in groove 234. For easier installation of gasket 212, corners 240 and 242 of flange 232 are radiused or chamfered. Flange 232 and groove 234 are dimensioned so that a cavity 244 forming a part of the groove lies radially outwardly from the flange. Cavity 244 may be filled with cement or the like to fix flange 232 in groove 234, and concurrently to provide a continuous seal therewith and with peripheral edges 202 of plates 198 and 206.

It can be seen, therefore, that the spirit level of the present invention is well adapted to carry out the objects and attain the ends and advantages mentioned, as well as those inherent therein. While two presently preferred embodiments of the invention have been described for the purposes of this disclosure, numerous changes in the construction and arrangement of parts can be made by those skilled in the art. All such changes are encompassed within the scope and spirit of this invention as defined by the appended claims.

What is claimed is:

1. A spirit level comprising:
   a frame of right parllelepiped configuration, including a pair of opposed, parallel planar sides and defining a hole extending through the frame from one of said sides to the other, the parts of said hole opening at and immediately adjacent each of the respective sides being bounded by a surface of the frame extending substantially normal to the respective adjacent planar side;
   a liquid-containing level vial extending at least partially across the central portion of said hole and located between said hole parts;
   transparent sight plates extending at least partially across said hole on opposite sides of said vial and each extending substantially parallel to said opposed parallel sides;
   means between each of said sight plates and said vial limiting movement of each sight plate in said hole toward said vial;
   a pair of spaced gaskets in said hole retaining said sight plates against movement away from said vial, each of said gaskets being of generally triangular cross-sectional configuration and having an annular, centrally opened configuration, and each further comprising:
      a first substantially monoplanar side bearing against one of said sight plates, and having a radially inner edge;
      an annular resilient lip projecting radially inwardly from the radially inner edge of said monoplanar side and elastically deformed into the plane of said monoplanar side by sealing contact of said lip with said one sight plate; and
      a second radially outer side extending substantially parallel to said surface of the frame bounding said parts of the hole; and
   means engaging each gasket within the frame to prevent the respective gasket from moving away from the sight plate sealingly contacted by its respective lip.

2. A spirit level comprising:
   an elongated frame including a pair of sides and having a hole wall defining a hole extending through said frame from one of said sides to the other;
   a liquid-containing level vial extending at least partially across said hole at a location between said sides;
   a transparent sight plate extending at least partially across said hole;
   means for limiting movement of said sight plate in said hole toward said vial;
   a gasket in said hole retaining said sight plate against movement away from said vial, said gasket having an annular, centrally open configuration, and further comprising:
      a first substantially monoplanar side bearing against said sight plate, and having a radially inner edge;
      an annular resilient lip projecting radially inwardly from the radially inner edge of said monoplanar side and elastically deformed into the plane of said monoplanar side by sealing contact of said lip with said sight plate;
      a second radially outer side extending substantially parallel to said hole wall; and
      a portion adjacent said first and second sides defining a radially outwardly opening groove therein; and
   gasket retaining means for engaging said groove in said gasket and retaining said gasket in said sealing contact with said sight plate.

3. The spirit level of claim 2 wherein said gasket further comprises a second annular resilient lip projecting from said second side of said gasket toward one of said sides of said frame, said lip being elastically deformed into the surface of said second side by sealing contact of said lip with said hole wall.

4. The spirit level of claim 2 further comprising vial locating means for positioning said vial at said location in said hole.

5. The spirit level of claim 4 wherein said vial locating means comprises a first vial holder positionable in said hole and having a portion with a pair of vial engaging lugs, said portion defining a curvilinear surface with an arc of greater than 180° between said lugs into which an end of said vial may be inserted.

6. The spirit level of claim 2 wherein said movement limiting means is characterized at least in part by a surface extending radially inwardly from said opening, said surface engaging a side of said sight plate opposite said gasket.

7. The spirit level of claim 2 wherein said gasket engaging means includes a tongue on a sleeve positioned adjacent said hole wall, said tongue extending into said groove in said gasket for engagement therewith.

8. The spirit level of claim 7 wherein:
said tongue has a surface defining an angle with respect to the plane of said monoplanar side of said gasket; and
said groove in said gasket defines a cross section conforming to a cross section of said tongue.

9. The spirit level comprising:
a frame having a hole therethrough;
a sleeve positioned within said hole, and bearing against the portion of said frame which surrounds and defines said hole, and having a central opening therethrough substantially coaxial with said frame hole;
a level vial having an operating position within said central opening of said sleeve; and
vial holding means removably and adjustably positionable in said sleeve and defining a central opening therethrough substantially coaxial with said frame hole for holding said level vial in said operating position, said vial holding means comprising a portion having a pair of vial engaging lugs and defining a curvilinear surface therebetween with an arc greater than 180° into which an end of said leveling vial is inserted.

10. The spirit level of claim 9 further comprising fastening means for removably fastening said vial holding means to said sleeve.

11. The apparatus of claim 10 further comprising a cover for covering at least a portion of said vial holding means and said fastening means.

12. The spirit level of claim 9 further comprising:
a transparent plate extending across said frame hole and facilitating viewing therethrough; and
plate retaining means for holding said plate in a position spaced from said vial.

13. A spirit level comprising:
a frame having a hole therethrough;
a sleeve positioned within said hole and having a central opening therethrough substantially coaxial with said frame hole;
a level vial having an operating position within said central opening of said sleeve; and
vial holding means positionable in said sleeve and defining a central opening therethrough substantially coaxial with said frame hole for holding said level vial in said operating position, said vial holding means comprising a portion having a pair of vial engaging lugs and defining a curvilinear surface therebetween with an arc greater than 180° into which an end of said level vial is inserted;
a transparent plate extending across said frame hole and facilitating viewing therethrough; and
plate retaining means for holding said plate in a position spaced from said vial, said retaining means comprising:
a tongue extending radially inwardly from an edge of said sleeve adjacent said transparent plate; and
a gasket comprising:
a surface engageable with a surface of said plate;
an outer portion defining a radially outwardly opening groove therein, said tongue and groove dimensionally conforming and being mutually engageable such that said gasket surface is maintained in retaining contact with said plate and prevents movement thereof away from said vial.

14. The spirit level of claim 13 wherein said gasket further comprises an annular sealing lip at the radially inner edge of said surface, said lip angling toward said plate in a relaxed state and sealingly deflected into the plane of said plate by contact therewith for providing a continuous seal around said plate.

15. The spirit level of claim 14 wherein said gasket further comprises a peripheral surface with a lip extending therearound and angling toward a wall of said frame defining said hole therethrough and sealingly deflected to align with said frame wall for providing a continuous seal therearound.

16. Vial holding apparatus for replaceable mounting of tubular spirit level vials in an opening in a spirit level frame, said vial holding apparatus comprising:
a first vial holder having a first portion defining a curvilinear surface having an arc greater than 180° for holding an end of a vial and a second portion defining a curvilinear surface having an arc less than 180°; and
a second vial holder also having a first portion defining a curvilinear surface having an arc greater than 180° for holding an end of another vial and a second portion defining a curvilinear surface having an arc less than 180°, said first and second vial holders being positionable such that:
said second portion of said second vial holder is adjacent said vial held by said first portion of said first vial holder; and
said second portion of said first vial holder is adjacent said vial held by said first portion of said second vial holder.

17. The apparatus of claim 16, further comprising fastener means for fastening said first and second vial holders in said position.

18. The apparatus of claim 16 wherein the first portion of at least one of said vial holders comprises a pair of lugs extending therefrom toward the other of said vial holders, said lugs defining at least a portion of said first portion curvilinear surface.

19. The apparatus of claim 18 wherein said second portion curvilinear surface of said vial holders are spaced from said vials held by said adjacent first portions.

20. The apparatus of claim 18 wherein the second portion of at least said other vial holder defines a recess therein adjacent said second portion curvilinear surface for receiving an end of said lugs.

* * * * *